United States Patent [19]

Perkins

[11] 4,061,034

[45] Dec. 6, 1977

[54] FLUID PRESSURE SENSING DEVICE

[76] Inventor: Gerard T. Perkins, 19934 Southfield Road, Detroit, Mich. 48235

[21] Appl. No.: 675,444

[22] Filed: Apr. 9, 1976

Related U.S. Application Data

[63] Continuation-in-part of Ser. No. 599,050, July 25, 1975, abandoned.

[51] Int. Cl.² .......................... G01L 9/02; G01L 7/08; G01L 7/16
[52] U.S. Cl. ............................... 73/398 AR; 73/406; 73/419; 338/39; 338/42
[58] Field of Search .................. 73/398 AR, 419, 406, 73/205 R, 213; 338/39, 40, 42; 200/83 J, 83 N, 81.9 R

[56] References Cited

U.S. PATENT DOCUMENTS

| | | | |
|---|---|---|---|
| 2,790,043 | 4/1957 | Clason | 338/39 |
| 3,723,936 | 3/1973 | Zurstadt | 338/40 |

*Primary Examiner*—Donald O. Woodiel

*Attorney, Agent, or Firm*—Gifford, Chandler, Sheridan & Sprinkle

[57] ABSTRACT

A device operable in response to an input fluid force includes a housing having an inner surface and a fluid pressure responsive member carried within the housing and having a surface that abuts the inner surface of the housing. The surfaces are curved and their curvatures differ so that the fluid responsive member makes a rocking contact with the housing surface. A first force is exerted on the fluid pressure responsive member at one point and a variable force to be measured is exerted against the fluid pressure responsive member at a second point so that the point of contact of the curved housing surface and the curved surface of the fluid pressure responsive member varies as a function of the two forces. In one embodiment of the invention a variable electric resistance is arrayed along one of the surfaces and the point of contact of the two surfaces determines the resistance of an electric circuit passing through the two members to provide an electrical output indication proportional to the point of contact and accordingly the magnitude of the variable force.

20 Claims, 9 Drawing Figures

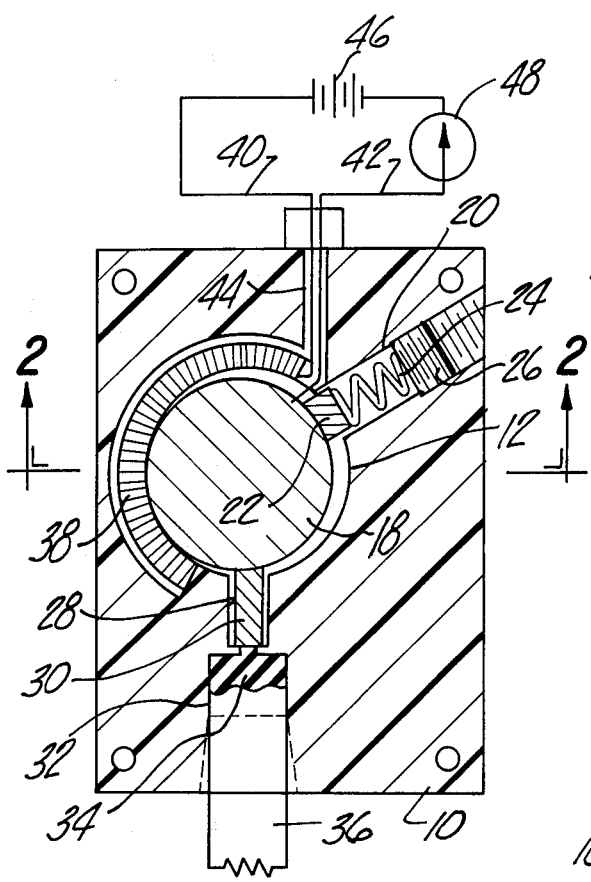
Fig-1
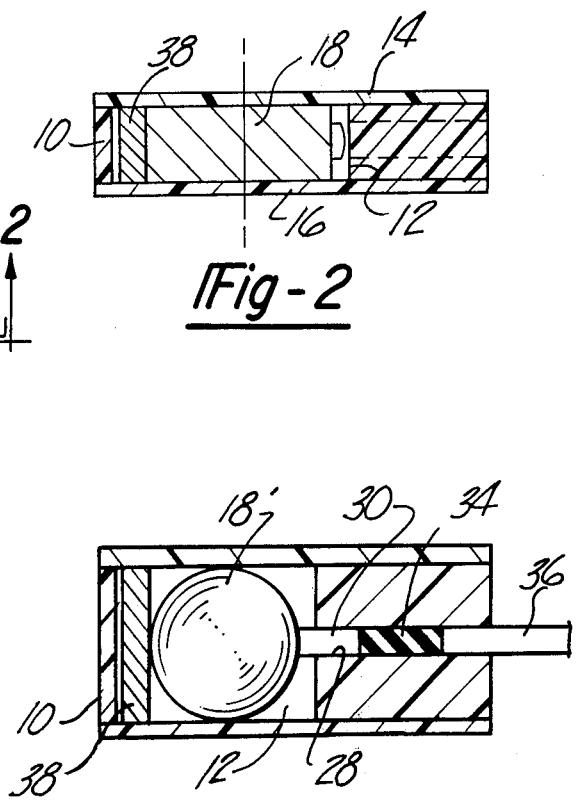
Fig-2
Fig-4
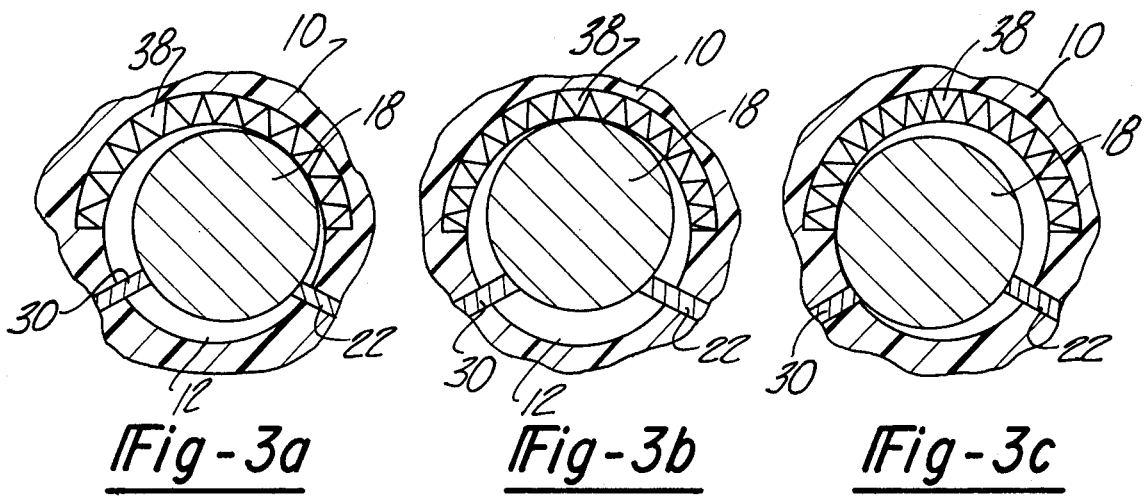
Fig-3a  Fig-3b  Fig-3c

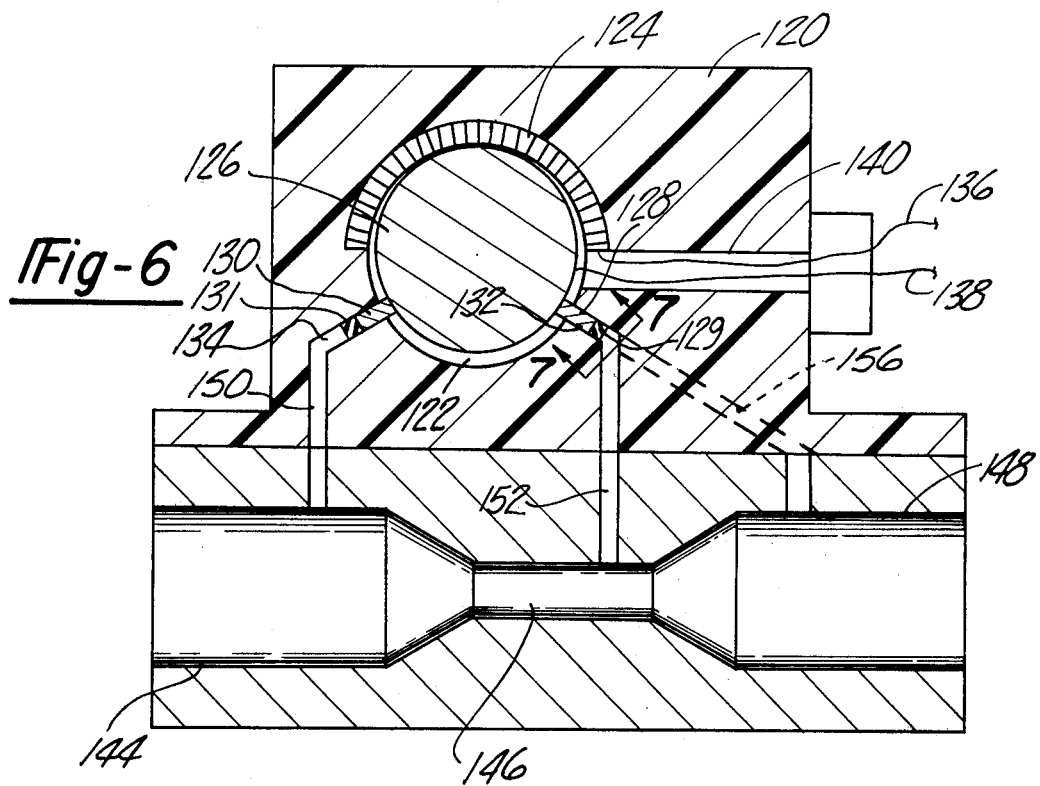
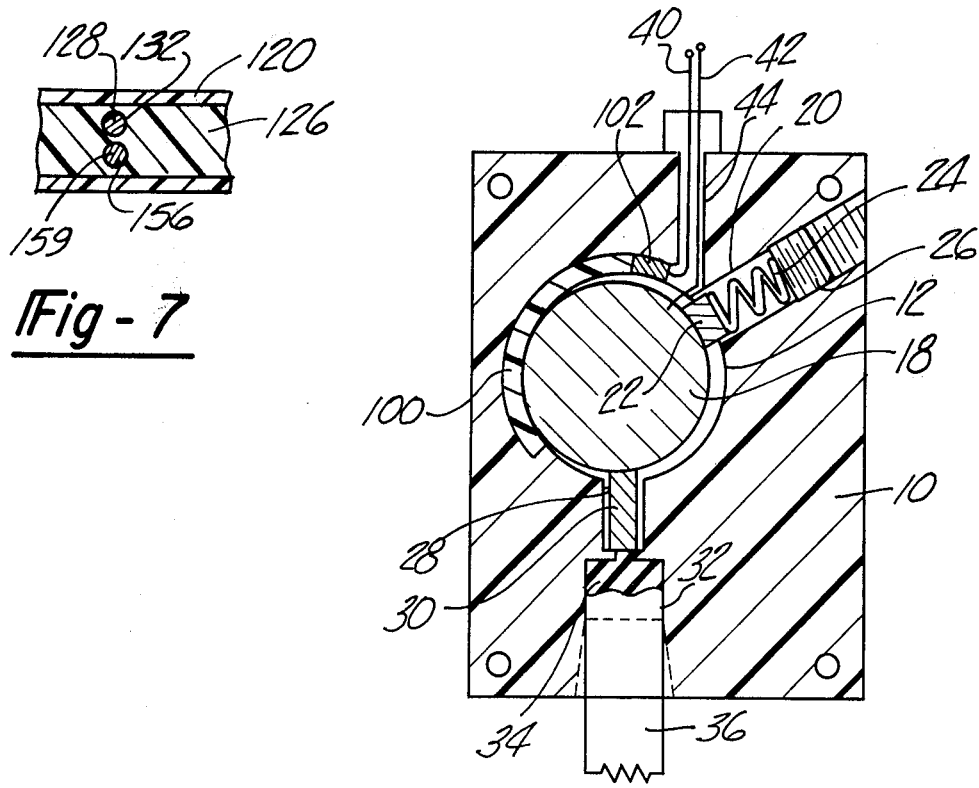

FLUID PRESSURE SENSING DEVICE

CROSS REFERENCE

This application is a continuation-in-part of application Ser. No. 599,050, entitled "Pressure Sensing Switch", filed on July 25, 1975 and now abandoned.

BACKGROUND OF THE INVENTION

I. Field of the Invention

This invention relates to devices responding to a force generated by a fluid pressure and more particularly to such a device which employs a pair of members which make rocking contact along curved surfaces and in which the point of contact varies with the force generated by a fluid pressure.

II. Prior Art

A wide variety of gages, transducers and switches exist which respond to fluid pressure to open or close contacts or to provide either a direct mechanical gage indication or an electrical output proportional to the force from a fluid pressure. Where such devices are used as indicators the input force derived from the fluid pressure typically uses a diaphragm or the like to convert the fluid pressure into movement of a mechanical member.

Prior art switches require many parts, are expensive and prone to malfunction.

SUMMARY OF THE INVENTION

The present invention is directed toward a fluid pressure responsive device which can be in the form of either a switch or a continuous pressure indicator and which is extremely simple in construction, typically employing only a single moving part, so as to be low in cost and reliable in operation. The device of the present invention is constructed to respond to the input fluid pressure in one embodiment to act as a switch and in another embodiment to provide an electrical output signal representative of the input fluid pressure.

The device of the present invention is characterized by its employment of two separate parts each having curved surfaces. These surfaces have different curvatures and the parts are supported to contact one another along the two surfaces so that the point of contact gradually changes along the length of the surfaces as the members move relative to one another. This arrangement is termed a "rocking contact". One of the surfaces may be convex and the other concave, with the concave surface having a smaller radius.

The members are supported for motion relative to one another and one member is fixed while the other member is movable. Means are provided for imposing two mechanical forces at separated points on the movable member. Each of these forces urges the movable member into contact with the fixed member at a different point along their elongated surfaces. One of the forces may be fixed, as imposed by a biasing spring, and the other force variable, or both of the forces may be variable. In either case the point of contact of the two elongated surfaces varies as a function of the ratio of the forces.

The forces are derived from fluid pressures through the use of diaphragms or the like.

The invention incorporates means for determining the point of contact of the two rocking surfaces. In one preferred embodiment this means takes the form of a variable resistance element arrayed along one of the surfaces. An electric circuit is established from one end of the resistance through the point of contact of the two members so that the resistance of the circuit is proportional to the point of contact of the two members.

In another embodiment the device acts as a switch and comprises a contact disposed along the fixed surface so that an electric circuit is closed when the movable member is moved by fluid pressure to a position closing the contact. My switch can, of course, be used for any number of purposes including but not limited to an indicator for indicating that the pressure in the fluid system has achieved a predetermined value.

My invention makes it possible to combine a plurality of forces and to compare their sum with a fixed or another variable force. In another embodiment of my invention subsequently disclosed in detail, a movable indicator member is subjected to a pair of forces, at angles with respect to one another, which are derived from fluid passages upstream of a flow restriction and within the restriction. Devices which measure the differential of forces at a flow restriction are normally highly sensitive to the viscosity of the fluid. To compensate the device for different viscosities and accordingly to render the device insensitive to viscosity, a force derived from a pressure measurement downstream from the orifice is exerted on the indicator at the same angle as the force derived from the pressure in the restriction. The difference between the fluid pressures upstream and downstream of the restriction varies directly as a function of the viscosity of the fluid. The sizes of the plungers that exert these three forces are adjusted so that the effect of changes in the fluid viscosity on the ratio between the upstream pressure and the restriction pressure are offset by changes in the ratio between the upstream pressure and the downstream pressure, rendering the device insensitive to fluid viscosity over a wide range of viscosities.

BRIEF DESCRIPTION OF THE DRAWINGS

Other objectives, advantages and applications of the present invention will be made apparent by the following detailed description of several preferred embodiments of the invention. The description makes reference to the accompanying drawings in which:

FIG. 1 is a sectional view through an embodiment of the invention wherein the indicator is a circular disc supported in a circular chamber of slightly larger diameter and an electrical resistance element arrayed along the perimeter of the chamber.

FIG. 2 is a sectional view through the device of FIG. 1 taken along lines 2—2 of FIG. 1;

FIGS. 3A, 3B and 3C are schematic diagrams illustrating the change in point of contact between the disc and chamber wall of the embodiment of FIGS. 1 and 2 as a function of the application of a variety of forces of varying magnitude;

FIG. 4 is a cross sectional view of the sensing device of the present invention similar to FIG. 2 but showing a modification thereof;

FIG. 5 is a cross sectional view of the sensing device of the present invention similar to FIG. 1 but showing yet another modification thereto;

FIG. 6 is a schematic diagram of a still further modification of the invention taking the form of a disc differential pressure gage compensated for fluid viscosity changes by a pressure tap taken from the restriction in the fluid flow path; and FIG. 7 is a fragmentary cross sectional view taken substantially along line 7—7 in FIG. 6.

DETAILED DESCRIPTION

In the embodiment of FIG. 1, an electrical transducer is formed in accordance with the invention employing a flat rectangular housing 10 preferably formed from an electrical insulating material such as plastic. The housing has a central cylindrical chamber 12 covered by a pair of insulating plates 14 and 16. A circular indicator disc 18 formed of a conductive material, and having a slightly smaller diameter than the chamber 12, is supported within the chamber. For example, the chamber 12 may have a diameter of 2.00 inches and the disc may have a diameter of 1.90 inches. Accordingly the disc 18 can only make contact with the side wall of the chamber 12 along a single line extending transversely to the plane of the disc 18.

A cylindrical passage 20 is formed through the housing 10 between the chamber 12 and the outer edge of the housing 10. The passage 20 is formed substantially radially with respect to the center of the chamber 12. A cylindrical plunger 22 is supported for movement within the passage 20 and a coil spring 24 which is retained in the passage 20 by a screw cap 26 urges the plunger 22 into contact with the perimeter of the disc 18.

Another passage 28 is formed through the housing 10, to the chamber 12, radially with respect to the chamber 12 so as to make an angle of approximately 120° with respect to the center line of the passage 20. A second plunger 30 is supported within the passage 28 so as to contact a point on the edge of the disc 18. The passage 28 has an enlarged outer section 32 filled with a flexible sealant 34, such as silicone, which acts as a diaphragm. When fluid pressure is introduced into the passage enlargement 32 through a tube 36, the resultant pressure on the seal 34 moves the plunger 30 against the disc 18. The point of contact between the disc 18 and the circular wall of the chamber 12 will be determined by the ratio of the forces imposed by the two plungers 22 and 30.

In order to measure the point of contact, an elongated resistance element 38 is arrayed along one section of the cylindrical chamber wall between the points of contact of the plungers 22 and 30. A pair of electrical leads 40 and 42 pass through a hole 44 in the housing. The lead 40 is connected to an end of the linear resistor 38 and the lead 42 is connected to the disc 18. An electric circuit is thus established between the leads 40 and 42, through the disc 18 and that portion of the resistance element 38 between the point of contact of the disc 18 with the resistance element 38 and the point of contact of the lead 40 with the resistance element 38.

The resistance between the leads 42 varies as a function of the point of contact between the disc and the chamber wall and accordingly the ratio of the two forces imposed on the disc 12 by the plungers 22 and 30. The leads 40 and 42 may be connected to suitable electrical circuitry such as a series circuit including a battery 46 and an electrical meter 48 so that the meter indication varies as a function of the ratio of the forces imposed on the disc 18 by the plungers 22 and 30.

FIGS. 3A, 3B and 3C schematically illustrate the manner in which the point of contact of the disc 18 and the chamber wall varies as a function of the imposed forces in the device of FIGS. 1 and 2. In FIG. 3A the force imposed by the pressure sensing plunger 30 greatly exceeds the force imposed by the spring loaded plunger 22. Accordingly, the resultant direction of the two forces, and the point of contact of the disc 18 with the variable resistance 38, is substantially in line with the force imposed by the pressure related plunger 30. Note that the two forces do not oppose one another, but are rather summed up to generate a resultant point of contact of the disc 18 with the chamber wall. Thus, no strain is imposed on the device and it is not subject to the problems associated with a strain loaded device such as poor repeatability, fatigue, etc.

In the position of FIG. 3B, the forces imposed by the spring loaded plunger 22 and the pressure loaded plunger 30 are equal and the resultant direction of force and point of contact of the disc with the resistance 38 effectively bisects the angle that the two plungers 22 and 30 make with the center of the disc 18. In the position of FIG. 3C, the pressure imposed on plunger 30 is much smaller than the spring loaded force on the plunger 22 and the point of contact of the disc 18 with the chamber wall is substantially aligned with the direction of application of the force by plunger 22. It is thus seen that the point of contact of the disc with the wall varies as a function of the ratio of the two imposed forces.

The force on plunger 22 could be a direct mechanical force (as shown) or a force generated by a second fluid pressure.

The line of rocking contact between the indicator disc 18 and the housing results from the contact of two continuous surfaces having different degrees of curvature. As in the embodiment of FIGS. 1 and 2 one of the surfaces is concave and the other is convex.

A modified form of the invention is illustrated in FIG. 4 in which a spherical indicator member 18' replaces the disc 18 within the cylindrical chamber 12. A point to point electrical contact, rather than a line to line electrical contact, is formed between the spherical member 18' and the resistance element 38 but otherwise the modification to the invention illustrated in FIG. 4 functions substantially the same as the embodiment of FIGS. 1-3. Accordingly, for the sake of brevity, the operation of the spherical member 18' will not be described in detail.

A still further modification to the invention is illustrated in FIG. 5 in which the linear resistance element 38 of FIGS. 1-3 is replaced by a first curvilinear segment 100 and a second curvilinear segment 102 in an end to end abutting engagement with the first segment 100. As before, the first and second segments 100 and 102 together form a circular surface of a greater radius than the disc 18 so that the disc 18 makes a rocking contact with the segments 100 and 102. Unlike the embodiment of the invention in FIGS. 1-3, however, the first segment 100 is constructed of an electrical insulating material and may comprise a portion of the housing 10. Conversely, the second segment 102 is formed of an electrically conductive material and is attached to the lead 40. With this arrangement a closed electrical circuit is formed between leads 40 and 42 only when the disc 18 contacts the second segment 102. A closed circuit on leads 40 and 42 may be used to activate an alarm, a high pressure shut-off mechanism, or the like and it will be appreciated that the second segment 102 may be positioned at any desired circumferential position around the curved wall of the chamber 12.

The embodiment of FIGS. 6 and 7 represents a differential fluid pressure gage formed in accordance with the present invention. The device is built about an insulating housing 120 having a cylindrical cavity 122 formed centrally therein. An elongated resistance element 124 is supported along about one-half of the circular chamber wall.

A circular indicator disc 126 having a slightly smaller radius than the chamber 122 is supported within the chamber and is urged into contact with the resistance element 124 by a pair of plungers 128 and 130 which are supported for movement in a pair of passages 132 and 134 respectively, formed in the housing 120. A pair of electrical leads 136 and 138 pass through a hole 140 in the housing and connect respectively to one end of the resistance 124 and to the disc 126.

Fluid enters the device through a passage 144, flows through a restriction 146, and exits through a passage 148 of the same diameter as the passage 144. A sensing passage 150 connects the inlet passage 144 to the channel 134 that supports the plunger 130. The plunger 130 is therefore subjected to a force which is a function of the fluid pressure in inlet 144. An appropriate diaphragm 131 may be incorporated to seal the passage 134 about the plunger 130. Similarly, the pressure in the flow restriction 146 is connected to the passage 132 by a passage 152. This fluid force is exerted on the plunger 128 via a diaphragm 129.

In order to compensate for changes in viscosity and accordingly make the device insensitive to viscosity changes of the fluid over a wide range, a passage 156 imposes another force on the disc 126 at the same angle as the plunger 128 through another plunger 159 (FIG. 7) via a diaphragm.

The forces exerted by the plungers 128 and 130 will be in a ratio which is a function of both the rate of flow of the fluid through the device and the viscosity of the fluid. For a fluid of a given viscosity, these two forces will be in the ratio of the flow rate. The ratio of forces imposed by the plunger 130 and the plunger 159 will simply be proportional to the viscosity of the fluid since the fluid energy loss in passing through the restriction 146 is a function of its viscosity. Accordingly, by adjusting the sizes of the plungers 128 and 159 moved by the pressure in passage 152 and 156 respectively, the device may be rendered insensitive to the viscosity of the fluid over a wide range.

Having thus described my invention, I claim:

1. A fluid pressure responsive device comprising a housing; a chamber formed in said housing and having a curved wall section; a spherical member disposed within said chamber and having a curved surface formed on a radius smaller than that of said wall section whereby the circular surface of said member engages said curved wall section at different points depending upon the position of said member in said chamber; and fluid pressure means exerting a force on said member such that the position of said member in said chamber is a function of the magnitude of the fluid pressure exerted by said last mentioned means.

2. The fluid pressure responsive device as defined in claim 1 and including means for indicating the position of said member in said chamber whereby to indicate the magnitude of fluid pressure applied thereto.

3. The fluid pressure responsive device as defined in claim 1 and in which said last mentioned means includes means for generating a signal which is a function of the point of contact of the curved wall section and the curved surface of said member.

4. The device as defined in claim 3 wherein said curved wall section is circular.

5. The device as defined in claim 3 wherein said means for generating a signal further comprises a resistance element which forms the curved wall section of said chamber and means responsive to the electrical resistance between the point of contact and a predetermined point on said resistive element for indicating the position of said member.

6. The device as defined in claim 5 wherein said member is constructed of an electrically conductive material and including a first electrical lead connected to said predetermined point on said resistance element and a second electrical lead connected to said member whereby the electrical resistance between said first lead and said second lead is indicative of the position of said member within said chamber.

7. The device as defined in claim 1 and including means for indicating when said member contacts a predetermined location on said curved wall section.

8. The device as defined in claim 7 wherein both said predetermined location on said curved wall section said member are constructed of an electrically conductive material, said last mentioned means comprising a first electrical lead connected to said predetermined location on said curved wall section, a second lead connected to said member, and means responsive to a closed electrical circuit between said first and second leads.

9. The device as defined in claim 1 wherein said member is a circular disc.

10. The device as defined in claim 1 and including means for applying a predetermined constant force on said member so that the position of said member in said chamber is a function of the sum of the constant force and the force from the fluid pressure means.

11. The device as defined in claim 10 and including means for variably adjusting the constant force.

12. The device as defined in claim 10 wherein said constant force means comprises a piston and resilient means for urging said piston against said member.

13. The device as defined in claim 1 wherein said fluid pressure means comprises a piston and means for urging one end of said piston against said member, said last mentioned means comprising a flexible diaphragm having a first end abutting the other end of said piston and a second end in communication with the fluid pressure.

14. A device for measuring fluid pressure comprising: a body having an inlet passage, an outlet passage and a flow restriction connecting the inlet passage and the outlet passage; a housing; a chamber formed within the housing and having a curved wall section; a member disposed within the chamber and having a circular surface formed on a radius smaller than said curved wall section; whereby the member engages the curved wall section at different points depending upon the position of said member in said chamber; fluid pressure means for applying a force against said member proportional to the fluid pressure in the inlet; fluid pressure means for applying a second force against said member proportional to the fluid pressure in the restriction whereby the position of said member within the chamber is a function of the summation of the said first and second forces; and means for generating a signal representative of the point of contact between the member and the curved wall section of the chamber.

15. The device of claim 14 further including means for exerting a third force on said member parallel to said second force, said third force being proportional to the fluid pressure in said outlet passage so as to compensate the device for changes in viscosity of the fluid flowing through the body.

16. A fluid pressure responsive device comprising a housing; a chamber formed in said housing and having a curved wall section; a member disposed within said chamber and having a circular surface formed on a radius smller than that of said wall section whereby the circular surface of said member engages said curved wall section at different points depending upon the position of said member in said chamber; fluid pressure means exerting a force on said member such that the position of said member in said chamber is a function of the magnitude of the fluid pressure exerted by said last-mentioned means; and said fluid pressure means comprising a piston and means for urging one end of said piston against said member, said last-mentioned means comprising a flexible diaphragm having a first end abutting the other end of said piston and a second end in communication with the fluid pressure.

17. A fluid pressure responsive device comprising a housing; a chamber formed in said housing and having a curved wall section; a member disposed within said chamber and having a circular surface formed on a radius smaller than that of said wall section whereby the circular surface of said member engages said curved wall section at different points depending upon the position of said member in said chamber; fluid pressure means exerting a force on said member such that the position of said member in said chamber is a function of the magnitude of the fluid pressure exerted by said last-mentioned means; means for applying a predetermined constant force on said member so that the position of said member in said chamber is a function of the sum of the constant force and the force from the fluid pressure means, and said constant force means comprising a piston and resilient means for urging said piston against said member.

18. The device as defined in claim 17 wherein said member is spherical.

19. A fluid pressure responsive device comprising a housing; a chamber formed in said housing and having a curved wall section; a member disposed within said chamber and having a circular surface formed on a radius smaller than that of said wall section whereby the circular surface of said member engages said curved wall section at different points depending upon the position of said member in said chamber, means exerting a predetermined linearly directed constant force on said member and fluid pressure means exerting a linearly directed force on said member, said forces being directed toward said wall section at an angle with respect to each other to urge said member against said wall section whereby the position at which said member engages said wall section is a function of the sum of the constant force and the force from the fluid pressure means.

20. The device as defined in claim 19 and including means for generating a signal which is a function of the point of contact of the curved wall section and the curved surface of said member.

* * * * *